A. RECTOR.
GAS LAMP.
APPLICATION FILED NOV. 23, 1908.
955,903.
Patented Apr. 26, 1910.
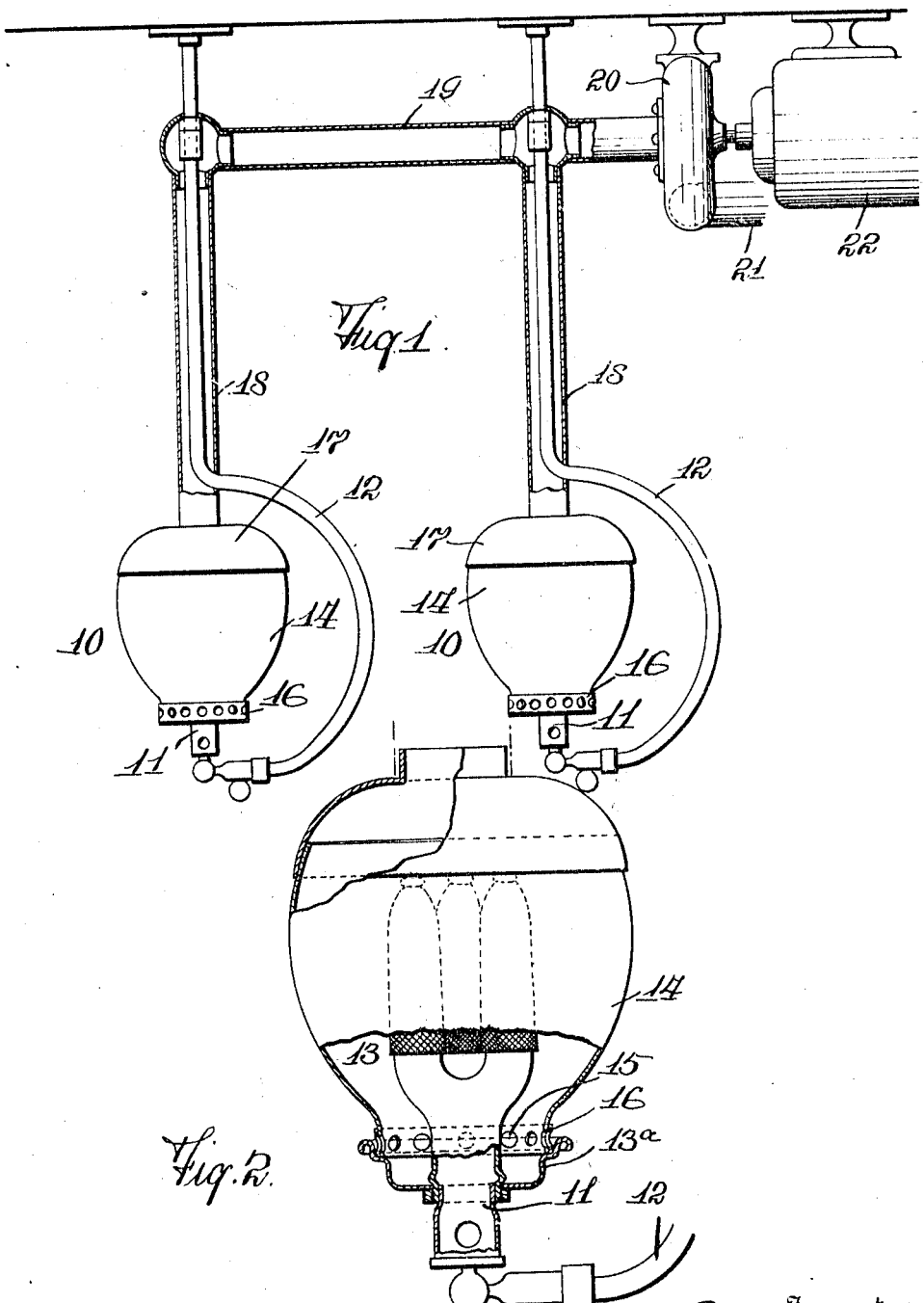

UNITED STATES PATENT OFFICE.

ALCORN RECTOR, OF NEW YORK, N. Y., ASSIGNOR TO RECTOR GAS LAMP COMPANY, OF NEW YORK, N. Y., A CORPORATION OF NEW YORK.

GAS-LAMP.

955,903.	Specification of Letters Patent.	Patented Apr. 26, 1910.

Application filed November 23, 1908. Serial No. 463,952.

*To all whom it may concern:*

Be it known that I, ALCORN RECTOR, of the city, county, and State of New York, have invented a new and useful Improvement in Gas-Lamps, of which the following is a full, clear, and exact description.

My invention relates to improvements in gas lamps, and the object of my invention is to produce a high efficiency and high power lamp which will give a much greater light than any ordinary incandescent gas lamp, and which has means for inducing an unusual supply of oxygen to the burners, and for carrying off any waste products of combustion, thus causing an unusually high heat and consequent great light at the mantle, and further furnishing good ventilation in the room.

I am aware that attempts have been made to force the draft on incandescent gas lamps, but usually the only means of promoting such additional supply of oxygen and for carrying away the products of combustion, has been by utilizing the rising heat and gas currents from the lamp to turn a wheel which would propel a second wheel below the burner to force the air to the lamp. These devices are absolutely inadequate to produce the desired result, as the wheels turn with feeble force and one practically counterbalances the other. Forced draft has also been provided for gas lamps by either compressing the gas or compressing the air and forcing these gases under pressure through the Bunsen burner, but apparatus of this kind involves the use of expensive and complicated machinery, which is not only expensive to install, but to maintain; whereas with my invention but little power is needed to exhaust the air from the globes, and the natural inrush of oxygen follows. Furthermore, where pressures are used which cause the gases to flow in with great velocity, special mantles are required which must be made much stronger than the ordinary commercial mantles to withstand the said increased pressure, whereas by my method of exhausting the air from the globe, no blast of gases or air is directed against the mantles, and the ordinary ones suffice. In carrying out my invention, however, I use globes which are air tight except at the bottom where the air supply is controlled, and connect tubes or pipes with the tops of the globes, and exhaust the air from these tubes or pipes and consequently from the globes, so that the products of combustion are carried off, a partial vacuum is created in the tops of the globes, and the inrushing air passes through the Bunsen tubes thus creating intense heat and high incandescence at the mantle.

Obviously the detail construction of the lamp is not very important so far as this particular invention is concerned, so long as means is provided for exhausting the globe and permitting the necessary influx of oxygen below the mantles and through the Bunsen tubes.

A lamp of this character is especially adapted for use in stations, stores, theaters, halls, and places where a great quantity of light is desired, and in such places the lamp affords great economy in lighting.

Reference is to be had to the accompanying drawings forming a part of this specification in which similar reference characters indicate corresponding parts in all the views.

Figure 1 is a sectional elevation showing an arrangement of two lamps embodying my invention, and Fig. 2 is an enlarged view partly in section, showing the construction of the lamp more in detail.

The lamp 10 may be any usual incandescent gas lamp, and as illustrated it has a bunsen 11 which also can be of any approved type, and this is supplied by a gas pipe 12 which permits the gas and air to flow through the bunsen to the group of mantles 13 which as shown, are vertically arranged and inclosed in a globe 14. The number of mantles is immaterial, however, and the arrangement of the gas pipe 12 can be varied indefinitely without affecting the principle of this invention. It is desirable, however, to provide for an inlet of air to the mantles, and so the globe holder 14 has perforations 15 near the bottom, which register with the perforations of a movable collar 16, this being supported above the gallery 13$^a$ on which the globe 14 rests.

The arrangement so far disclosed is not peculiar to this invention, and on the other hand this invention is not limited to the structure above set forth.

Each globe 14 has an air tight top 17, and this top connects with a pipe 18 which in turn connects by means of a pipe 19 with an exhaust fan 20, the discharge pipe 21 of which can be led off through an adjacent window or into a chimney, or in any place where it is convenient to discharge the products of combustion from the lamp. The fan can be run in any usual way, can be of any approved construction, and as shown is operated by the motor 22.

In Fig. 1, I have shown two lamps in connection with a single exhaust fan 20, and obviously any number of lamps from one up to any reasonable limit, can be connected with one set of exhaust pipes.

In operation it will be seen that when the air is exhausted from the pipes 18—19, the air is also exhausted from the upper part of the globes 14, and consequently a great quantity of air rushes in through the Bunsen tube 11 and through the holes 15, if these are open. The result is that with the necessary flow of gas, a big supply of oxygen is provided, and a wonderfully luminous lamp is produced.

It will be readily seen that this lamp besides burning with great efficiency and high power, has the desirable qualities of not only carrying away the materials which usually vitiate the surrounding air, but it serves actually as a ventilator for the room because it has a tendency to exhaust the air from the room, which is replaced by the inrushing air which comes through every available source of supply in connection with the room in which the lamp is located.

The arrangement which I have described and shown has the further advantage of being specially adapted for use in warm weather, as I find that by artificially exhausting the air from the globe and carrying it away through a pipe, the heat is thereby carried away and the lamps radiate very little heat.

I am aware that attempts have been made to promote combustion and to increase the oxygen supply by providing tall chimneys for gas lamps, thereby increasing the natural draft, but I believe that I am the first to use an artificial means for exhausting the air from above the mantles, and in the claims I use the term "artificial" as opposed to natural draft, and applying to any mechanical device for exhausting the air from the globes and the pipes connected therewith.

Having thus fully described my invention, I claim as new and desire to secure by Letters Patent:—

1. An incandescent gas lamp comprising a containing globe, a Bunsen tube projecting into the globe and having means for receiving its air supply from the air immediately surrounding the globe, an exhaust pipe leading from the globe to carry out the products of combustion, and an exhaust fan to exhaust the pipe and globe, said fan being located near the outlet of the exhaust pipe.

2. An incandescent gas lamp having a containing globe for the lamp, a pipe leading from above the lamp to carry off the products of combustion, a Bunsen tube for the lamp, means for supplying air to the Bunsen be at atmospheric pressure from the air immediately surrounding the lamp, and an exhaust fan located near the outlet of the exhaust pipe.

3. The combination with an incandescent gas lamp, of means for supplying the Bunsen tube with air at atmospheric pressure from the air immediately surrounding the lamp, a containing globe for the lamp, an exhaust pipe leading from the globe for carrying off the products of combustion, and means connected with and auxiliary to said exhaust pipe to increase said draft.

4. The combination with a series of incandescent gas lamps having an inclosing structure adapted to shut off the air inlet except through the Bunsen tubes, means for supplying air to the Bunsen tubes from the air immediately surrounding the lamps, a pipe connected with the inclosing structure of the lamps, and an exhaust fan located near the outlet of the pipe to exhaust the air therefrom.

5. An incandescent gas lamp having an inclosing globe, a Bunsen tube projecting through the globe, means for supplying the air at atmospheric pressure to the Bunsen tube from the air immediately surrounding the globe, a pipe leading from the upper part of the globe, and means located near the outlet of the pipe for increasing the natural draft thereof.

ALCORN RECTOR.

Witnesses:
WARREN B. HUTCHINSON,
GEO. H. OPDYKE.